United States Patent
Lee et al.

(10) Patent No.: US 10,754,163 B2
(45) Date of Patent: Aug. 25, 2020

(54) IMAGE GENERATION METHOD AND DISPLAY DEVICE USING THE SAME

(71) Applicant: LG Display Co., Ltd., Seoul (KR)

(72) Inventors: Hochul Lee, Paju-si (KR); Sanglyn Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 222 days.

(21) Appl. No.: 16/041,531

(22) Filed: Jul. 20, 2018

(65) Prior Publication Data

US 2019/0064530 A1 Feb. 28, 2019

(30) Foreign Application Priority Data

Aug. 25, 2017 (KR) .................. 10-2017-0107933

(51) Int. Cl.
| | |
|---|---|
| *G02B 27/01* | (2006.01) |
| *G06F 3/01* | (2006.01) |
| *G06T 19/00* | (2011.01) |
| *G09G 3/20* | (2006.01) |
| *G06F 1/16* | (2006.01) |

(52) U.S. Cl.
CPC ....... *G02B 27/0179* (2013.01); *G02B 27/017* (2013.01); *G06F 1/163* (2013.01); *G06F 3/011* (2013.01); *G06F 3/012* (2013.01); *G06F 3/013* (2013.01); *G06T 19/006* (2013.01); *G09G 3/2096* (2013.01); *G02B 2027/0138* (2013.01); *G02B 2027/0187* (2013.01); *G09G 2340/0435* (2013.01); *G09G 2340/16* (2013.01)

(58) Field of Classification Search
CPC .................. G06F 3/011; G06F 3/012
See application file for complete search history.

(56) References Cited

U.S. PATENT DOCUMENTS

| | | | | |
|---|---|---|---|---|
| 5,579,026 | A * | 11/1996 | Tabata | G02B 27/017 345/8 |
| 5,781,165 | A * | 7/1998 | Tabata | G02B 27/017 345/8 |
| 8,970,495 | B1 * | 3/2015 | Biffle | G09G 3/003 345/158 |
| 9,928,660 | B1 * | 3/2018 | Vembar | G06F 3/14 |
| 2013/0117377 | A1 | 5/2013 | Miller | |
| 2014/0307783 | A1 | 10/2014 | Kim et al. | |
| 2017/0076425 | A1 * | 3/2017 | Folse | G02B 27/0179 |
| 2017/0343823 | A1 * | 11/2017 | Tagawa | G09G 5/00 |
| 2018/0075654 | A1 * | 3/2018 | Vembar | G06F 3/14 |
| 2018/0182273 | A1 * | 6/2018 | Hwang | G09G 3/001 |

(Continued)

FOREIGN PATENT DOCUMENTS

| | | |
|---|---|---|
| KR | 10-2014-0093970 A | 7/2014 |
| KR | 10-2015-0034703 A | 4/2015 |
| KR | 10-2017-0018930 A | 2/2017 |

*Primary Examiner* — Patrick F Marinelli
(74) *Attorney, Agent, or Firm* — Seed Intellectual Property Law Group LLP

(57) ABSTRACT

An image generation method and a display device using the same are disclosed. The image generation method includes receiving an angle value obtained from a motion sensor, calculating a pixel displacement value based on the angle value, generating interpolated frame data by shifting frame data of the input image displayed on the screen by the pixel displacement value, and displaying the frame data of the input image and the interpolated frame data on the screen.

7 Claims, 14 Drawing Sheets

(56) References Cited

U.S. PATENT DOCUMENTS

| | | | |
|---|---|---|---|
| 2018/0261003 A1* | 9/2018 | Peli | G09G 3/001 |
| 2018/0335835 A1* | 11/2018 | Lemoff | G06F 3/013 |
| 2019/0027120 A1* | 1/2019 | Croxford | G09G 5/391 |
| 2019/0064530 A1* | 2/2019 | Lee | G02B 27/0179 |
| 2019/0066353 A1* | 2/2019 | Anderson | G06T 15/005 |

* cited by examiner

IMAGE GENERATION METHOD AND DISPLAY DEVICE USING THE SAME

CROSS-REFERENCE TO RELATED APPLICATION(S)

This application claims the priority benefit of Korean Patent Application No. 10-2017-0107933 filed on Aug. 25, 2017, the entire contents of which is incorporated herein by reference for all purposes as if fully set forth herein.

BACKGROUND

Technical Field

The present disclosure relates to an image generation method for reflecting a motion of a user on a screen in real time without delay based on an angle value obtained from a motion sensor, and a display device using the same.

Description of the Related Art

Virtual reality technology is rapidly advancing in defense, architecture, tourism, movies, multimedia, and games. Virtual reality refers to a specific environment or situation that is similar to a real environment by using stereoscopic image technology.

Virtual reality (hereinafter, referred to as "VR") systems move a stereoscopic image depending on a motion of a user and output stereoscopic sound to provide a virtual experience to the user. The VR systems are implemented as Head Mounted Display (HMD) and Face Mounted Display (FMD). Augmented reality (AR) systems make digital content appear superimposed on the real world. The augmented reality system is implemented as Eye Glasses-type Display (EGD).

In the VR system, latency until an input image is displayed on a screen of a display panel greatly affects image quality. Image data generated from a graphics processing unit (hereinafter, referred to as "GPU") is written into pixels of the display panel through a display driver. Data of the input image is displayed on the pixels after a total delay time, which is sum of an image processing delay time of the GPU and a delay time of a display device. If the total delay time is long, the user can feel screen drag or motion blur. This phenomenon not only degrades image quality but also increases fatigue of the user.

If motion to photon latency is large in the VR/AR system, motion sickness or dizziness may be caused. The motion to photon delay is a time required until the screen is updated so that the motion of the user is reflected on a display screen. If the motion to photon delay is large, the display screen is updated later than the motion of the user, so that an image on the screen will move later when the user turns his or her head.

In the VR/AR system, since the GPU generates the image data when the motion of the user is detected, frame per second (FPS) of an image generated by the GPU is not constant. This causes persistence. In addition, if the FPS is not constant, it causes motion blur or motion judder in an image reproduced on the screen when the user turns his or her head.

BRIEF SUMMARY

The present disclosure provides an image generation method for preventing motion blur and motion judder generated when a user moves, and a display device using the same.

In one embodiment, there is provided an image generation method of a display device including a display panel configured to display an input image on a screen having a horizontal resolution and a vertical resolution, the method including receiving an angle value obtained from a motion sensor, calculating a pixel displacement value based on the angle value, generating interpolated frame data by shifting frame data of the input image displayed on the screen by the pixel displacement value, and displaying the frame data of the input image and the interpolated frame data on the screen.

The pixel displacement value may include a first pixel displacement value calculated by multiplying the angle value by an up and down resolution ratio of the screen to an up and down viewing angle of a user, and a second pixel displacement value calculated by multiplying the angle value by a left and right resolution ratio of the screen to a left and right viewing angle of the user.

In another embodiment, there is provided a display device including a display panel configured to display an input image on a screen having a horizontal resolution and a vertical resolution, a motion calculator configured to calculate a pixel displacement value based on an angle value obtained from a motion sensor, an interpolation frame generator configured to generate interpolated frame data by shifting frame data of the input image displayed on the screen by the pixel displacement value, and a display driver configured to display the frame data of the input image and the interpolated frame data on the screen.

In another embodiment, there is provided a display device including a display panel configured to display an input image on a screen having a horizontal resolution and a vertical resolution, and a display driver configured to write pixel data of nth (n is a positive integer) and (n+1)th frame data to the display panel.

The display driver receives an angle value reflecting a motion of a user, converts the angle value into a pixel displacement value, and generates the (n+1)th frame data by shifting the nth frame data by the pixel displacement value.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
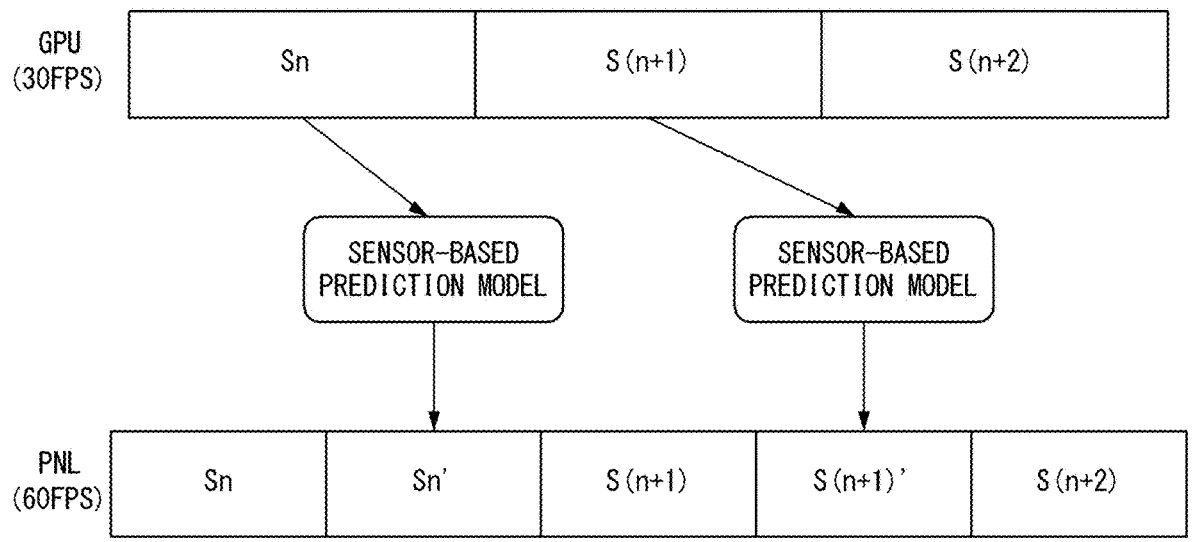
FIG. 1 is a diagram illustrating an image generation method according to an embodiment of the present disclosure.

Advantages and features of the present disclosure and methods for accomplishing the same will become apparent with reference to embodiments described in detail below with reference to the accompanying drawings. However, the present disclosure is not limited to the embodiments disclosed below, and may be implemented in various forms. These embodiments are provided so that the present disclosure will be exhaustively and completely described, and will fully convey the scope of the present disclosure to those skilled in the art to which the present disclosure pertains. The present disclosure is defined by the scope of the claims.

Shapes, sizes, ratios, angles, number, and the like illustrated in the drawings for describing embodiments of the present disclosure are merely exemplary, and the present disclosure is not limited thereto. Like reference numerals designate like elements throughout the description. In the following description, when a detailed description of well-known functions or configurations related to this document is determined to unnecessarily cloud a gist of the disclosure, the detailed description thereof will be omitted.

In the present disclosure, when the terms 'equip', 'include', 'have', 'comprised of', etc. are used, other components may be added unless '~only' is used. A singular expression can include a plural expression as long as it does not have an apparently different meaning in context.

In the explanation of components, even if there is no separate description, it is interpreted as including an error range.

In the description of position relationship, when a structure is described as being positioned 'on or above', 'under or below', 'next to' another structure, this description should be construed as including a case in which the structures contact each other as well as a case in which a third structure is disposed therebetween.

In the following description of the embodiment, the terms "first", "second", etc. may be used to describe various components, but the components are not limited by such terms. These terms are only used to distinguish one component from another component.

The features of various embodiments of the present disclosure can be partially combined or entirely combined with each other, and is technically capable of various interlocking and driving. The embodiments can be independently implemented, or can be implemented in conjunction with each other.

Hereinafter, preferred embodiments of the present disclosure will be described in detail with reference to the accompanying drawings. Like reference numerals designate like elements throughout the description. In the following description, when a detailed description of well-known functions or configurations related to this document is determined to unnecessarily cloud a gist of the disclosure, the detailed description thereof will be omitted.

A display device of the present disclosure is applicable to a system such as a VR system and an AR system in which a frame of image data is updated depending on a motion of a user. The display device of the present disclosure can be implemented as a flat panel display device such as a liquid crystal display (LCD), an organic light emitting diode (OLED) display, or the like.

The VR/AR system can detect the motion of the user using a motion sensor and update the frame of the image data reproduced from the display device when the user moves. The motion sensor may provide pitch, yaw and roll information as angle values. The motion sensor may include a gyro sensor or an acceleration sensor.

In an image generation method of the present disclosure, an angle value received from the motion sensor is converted into a pixel displacement value, and an nth (n is a positive integer) frame data is shifted by the pixel displacement value to generate interpolated frame data. The interpolated frame data is added between the nth frame data and an (n+1)th frame data generated from a GPU to increase a frame rate (or refresh rate) of an image reproduced by the display device.

Figure 2:
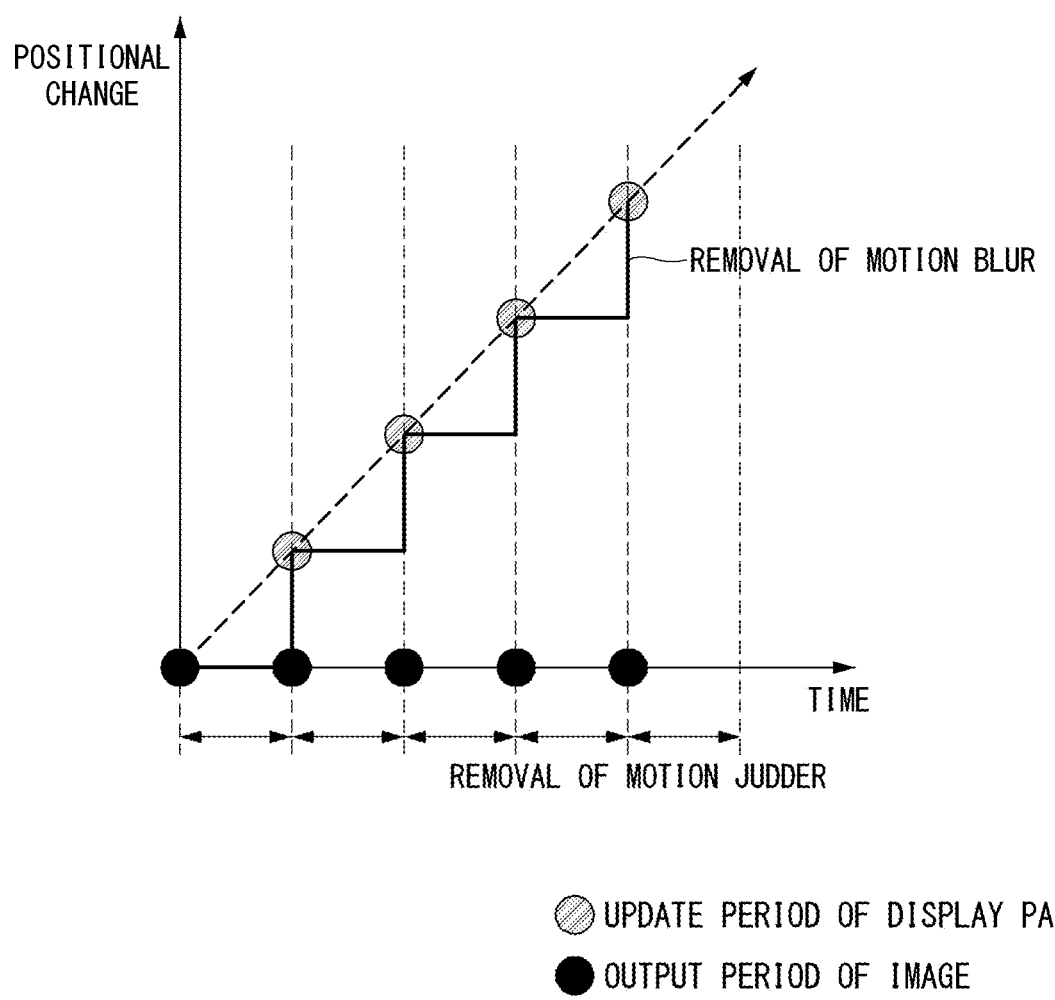
FIG. 2 is a diagram illustrating effects of removal of motion blur and motion judder in the present disclosure.

FIG. 1 is a diagram illustrating an image generation method according to an embodiment of the present disclosure. FIG. 2 is a diagram illustrating effects of removal of motion blur and motion judder in the present disclosure. In FIG. 2, a positional change axis represents a relative positional change of an object displayed on a display screen when a user turns his/her head while wearing an AR/VR device.

Referring to FIGS. 1 and 2, a GPU generates frame data Sn, S(n+1), and S(n+2) of an input image with a predetermined frame per second (FPS), for example, a frame rate of 30 FPS. The GPU may generate the frame data S(n+1) to reflect a motion of the user when the user moves. According to the present disclosure, interpolated frame data is generated in response to an output of a motion sensor in a display device, so that it is not necessary to generate the interpolated frame data in the GPU.

The display device of the present disclosure is connected to the motion sensor and the GPU. The display device of the present disclosure receives input image data from the GPU, generates the interpolated frame data Sn', S(n+1)' using a sensor-based prediction model, and updates an image displayed on the display screen by FPS higher than the FPS of the GPU, for example, 60 FPS, to increase the frame rate. In FIG. 1, "PNL" represents a display panel on which the display screen is implemented. The sensor-based prediction model converts an angular value received from the motion sensor into a pixel displacement value and generates the interpolated frame data shifted by the pixel displacement value in comparison with a previous frame data.

The VR/AR device is manufactured in a form of HMD, FMD, and EGD. While the user wears the VR/AR device to reproduce VR/AR content, when the user's head moves, the image on the display screen moves in a direction opposite to the motion of the user. The motion sensor outputs motion information of the user as an angle value when the user moves. The display device of the present disclosure calculates the pixel displacement value based on the angle value output from the motion sensor and reflects the motion of the user on the display screen in real time. The pixel displacement value is a positional change value of the image displayed on the display screen. Since the present disclosure generates the pixel displacement value depending on the output of the motion sensor having little delay, the display screen can be updated by reflecting the motion of the user without motion to photon latency. Further, since the present disclosure can generate the interpolated frame data in response to the output of the motion sensor every frame to increase the frame rate, it is possible to prevent motion blur and motion judder by updating the screen with a constant FPS as shown in FIG. 2.

On the other hand, a motion estimation and motion compensation (MEMC) algorithm stores one frame data of the input image in a frame memory and estimates a motion of the image in comparison with pixel data in a block unit between a previous frame and a current frame. Since the motion estimation and motion compensation (MEMC) algorithm generates the interpolated frame data after a delay of one frame period, a delay of more than one frame period cannot be avoided. Since the present disclosure calculates the pixel displacement value depending on the output of the motion sensor without the motion estimation and motion compensation (MEMC) algorithm, the interpolated frame data can be generated without a delay time until the motion of the user is reflected on the display screen.

Figure 3:
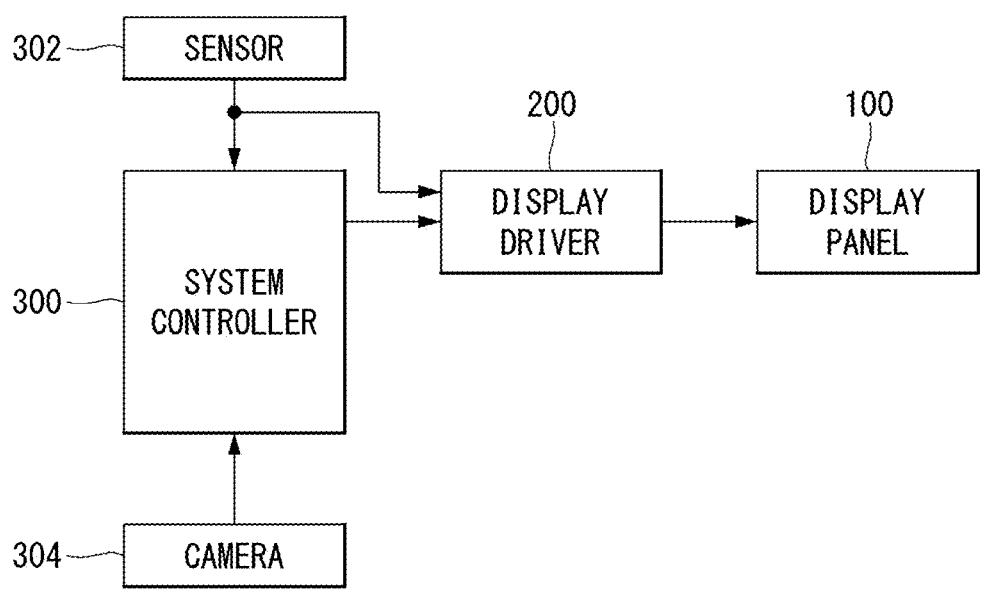
FIG. 3 is a block diagram illustrating a display device according to an embodiment of the present disclosure.
Figure 4:
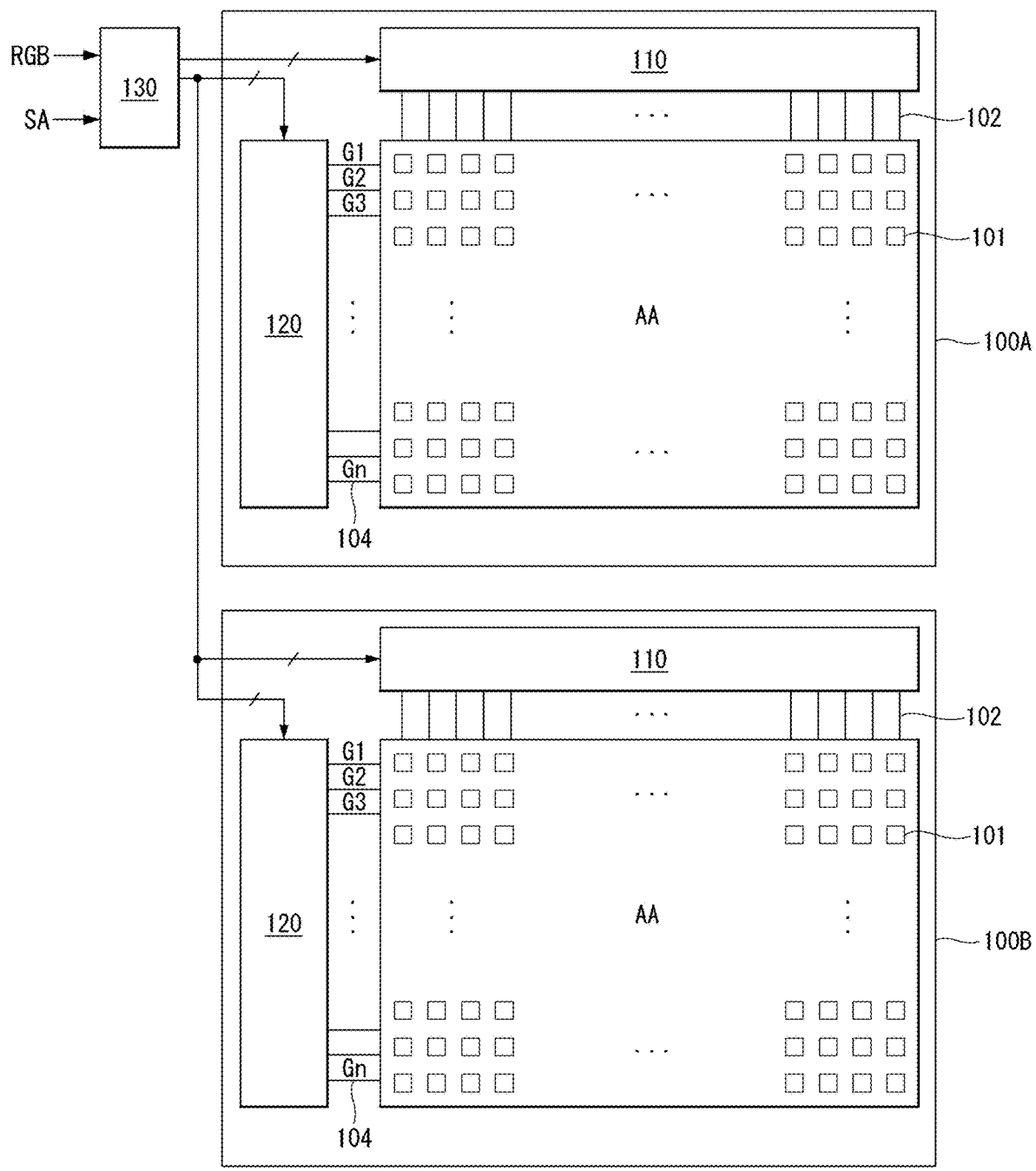
FIG. 4 is a detailed view illustrating a display driver and a display panel shown in FIG. 3.

FIG. 3 is a block diagram illustrating a display device according to an embodiment of the present disclosure. FIG. 4 is a detailed view illustrating a display driver and a display panel shown in FIG. 3.

Referring to FIGS. 3 and 4, a display device of the present disclosure includes display panels 100, 100A, and 100B, a system controller 300, a display driver 200, and the like.

The system controller 300 may be a VR/AR system, but is not limited thereto. For example, the system controller 300 may be any one of a television (TV) system, a computer system, a set-top box, a navigation system, a DVD player, a Blu-ray player, a home theater system, a mobile device system and a wearable device system.

The system controller 300 is connected to a motion sensor 302, a camera 304, and the like. The system controller 300 further includes an external device interface connected to a memory or an external video source, a user interface for receiving user commands, and a power supply for generating power. The external device interface, the user interface, a power supply, and the like are omitted from the drawings. The external device interface may be implemented as various known interface modules such as a universal serial bus (USB) and a high definition multimedia interface (HDMI).

The system controller 300 may include a GPU for performing image processing of an input image. The GPU converts a resolution of the input image to match a resolution of the display panel 100, 100A, 100B. The GPU analyzes the image obtained from the camera 304 with a predetermined eye tracking algorithm to estimate a focus area of the user's gaze. The GPU may be generate frame data by increasing a resolution of the focus area using a foveated rendering algorithm and lower the resolution of the input image in a surrounding area outside the focus area, so that it is possible to speed up screen update in response to a pupil motion of the user. The system controller 300 transmits image data output from the GPU to the display driver 200.

The display panel 100 may be implemented as a display panel in which an image is displayed on a flat panel display device such as a liquid crystal display (LCD), a field emission display (FED), and an electroluminescent display. The electroluminescent display may be classified into an inorganic light emitting display and an organic light emitting display depending on material of a light emitting layer. An example of the inorganic light emitting display is a quantum dot display.

A pixel array of the display panel 100 implements a display screen AA in which the input image is reproduced. The pixel array includes data lines 102 to which data voltages are applied, gate lines (or scan lines) 104 to which gate pulses (or scan pulses) are applied, and pixels arranged in a matrix form by an orthogonal structure of the data lines 102 and the gate lines 104 and electrically connected to the data lines 102 and gate lines 104. Each of the pixels is divided into a red sub-pixel 101, a green sub-pixel 101 and a blue sub-pixel 101 for color implementation. Each of the pixels may further include a white sub-pixel 101. Each of the sub-pixels may include one or more thin film transistors (TFTs).

In a case of the VR/AR system, as shown in FIG. 4, the display panel 100 may be divided into a first display panel 100A displaying left eye image data and a second display panel 100B displaying right eye image data.

The display driver 200 receives an eye tracking result indicating position information of the focus area and an input image processed with the foveated rendering algorithm from the system controller 300. The display driver 200 may divide one frame of the input image into the focus area and the surrounding area based on the position information of the focus area. The display driver 200 writes the image data received from the system controller 300 into the pixels of the display panel 100. The display driver 200 includes a timing controller 130, a data driver 110, a gate driver 120, and the like shown in FIG. 4.

In a case of a virtual reality device, the display driver 200 divides the focus area from the surrounding area on a screen of each of the display panels 100A and 100B, and sets a frame frequency of the display panels 100A and 100B to be equal to or higher than an input frame frequency of the image data received from the system controller 300. The display driver 200 may reduce the number of shifts of a gate signal applied to the gate lines in the surrounding area as compared with the focus area.

The display driver 200 writes data of the input image on the display panels 100A and 100B. The display driver 200 includes the data driver 110, the gate driver 120, the timing controller 130, and the like in each of the display panels 100A and 100B. The data drivers 110 connected to the display panels 100A and 100B may share one timing controller 130.

The data driver 110 converts the data of the input image received from the timing controller 130 into a gamma compensation voltage to generate a voltage (data voltage) of an analog data signal, and outputs the data voltage to the data lines 102. The gate driver 120 outputs the gate signal (or the scan signal) synchronized with the data voltage to the gate lines 104.

The gate driver 120 includes a shift register for sequentially supplying the gate signal to the gate lines by shifting the pulse of the gate signal. The gate driver 120 shifts the gate signal output to the gate lines 104 under control of the timing controller 130. The gate driver 120 can reduce the number of shifts of the gate signal applied to the gate lines in the surrounding area as compared with the focus area viewed by the user on the screen under the control of the timing controller 130.

An input terminal of the timing controller 130 is connected to the system controller 300 and the motion sensor 302. An output terminal of the timing controller 130 is connected to the data driver 110 and the gate driver 120. The timing controller 130 may include an image generation device shown in FIG. 5. The image generation device executes the sensor-based prediction model algorithm shown in FIG. 1.

The timing controller 130 generates interpolated frame data in response to an output SA of the motion sensor 302, and inserts the interpolated frame data between the frame data of the input image RGB received from the system controller 300 to increase a frame rate. The timing controller 130 generates the interpolated frame data in response to the output SA of the motion sensor 302, so that it can reflect a motion of the user on the display screen in real time without delay by shifting the image on the display screen by a pixel displacement value reflecting the motion of the user in real time. The image data output by the timing controller 130 is transmitted to the data driver 110.

The timing controller 130 receives timing signals synchronized with the input image data from the system controller 300 and controls operation timings of the data driver 110 and the gate driver 120 based on the timing signals.

Figure 5:
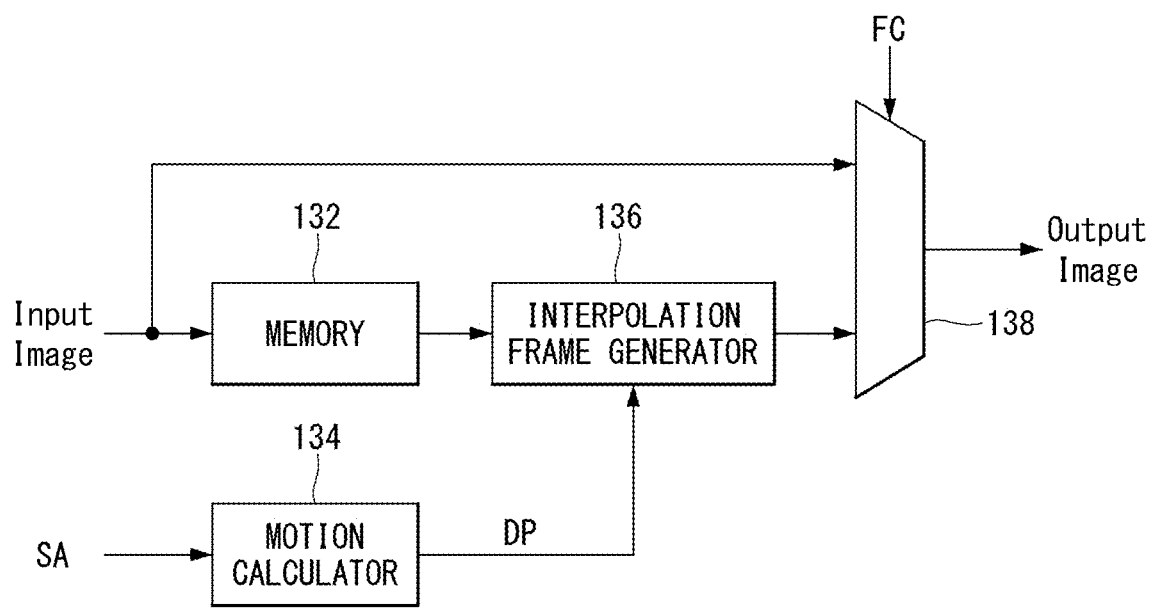
FIG. 5 is a diagram illustrating an image generation device according to an embodiment of the present disclosure.
Figure 6:
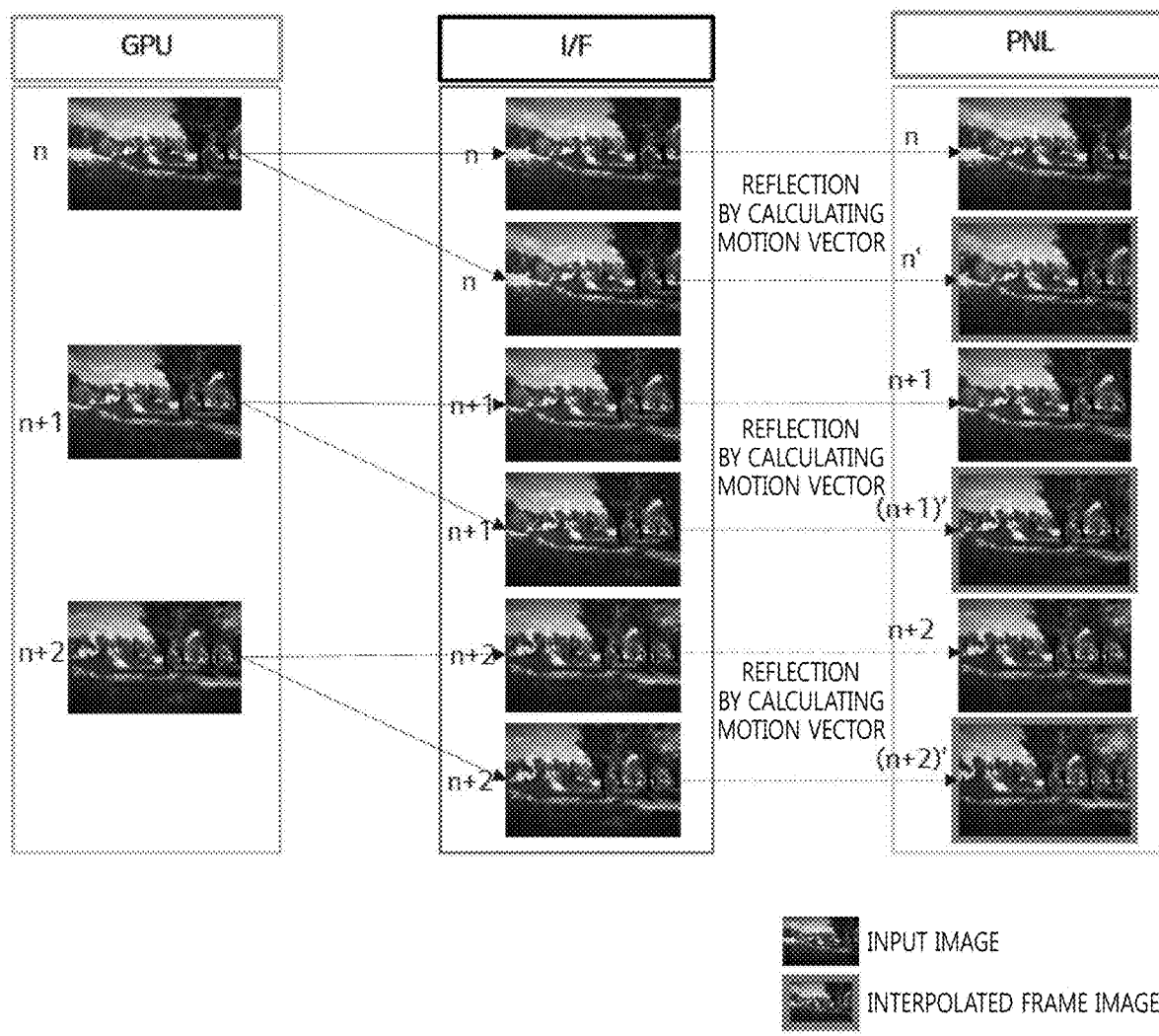
FIG. 6 is a view illustrating an input/output image of an image generation device shown in FIG. 5.
Figure 7A:
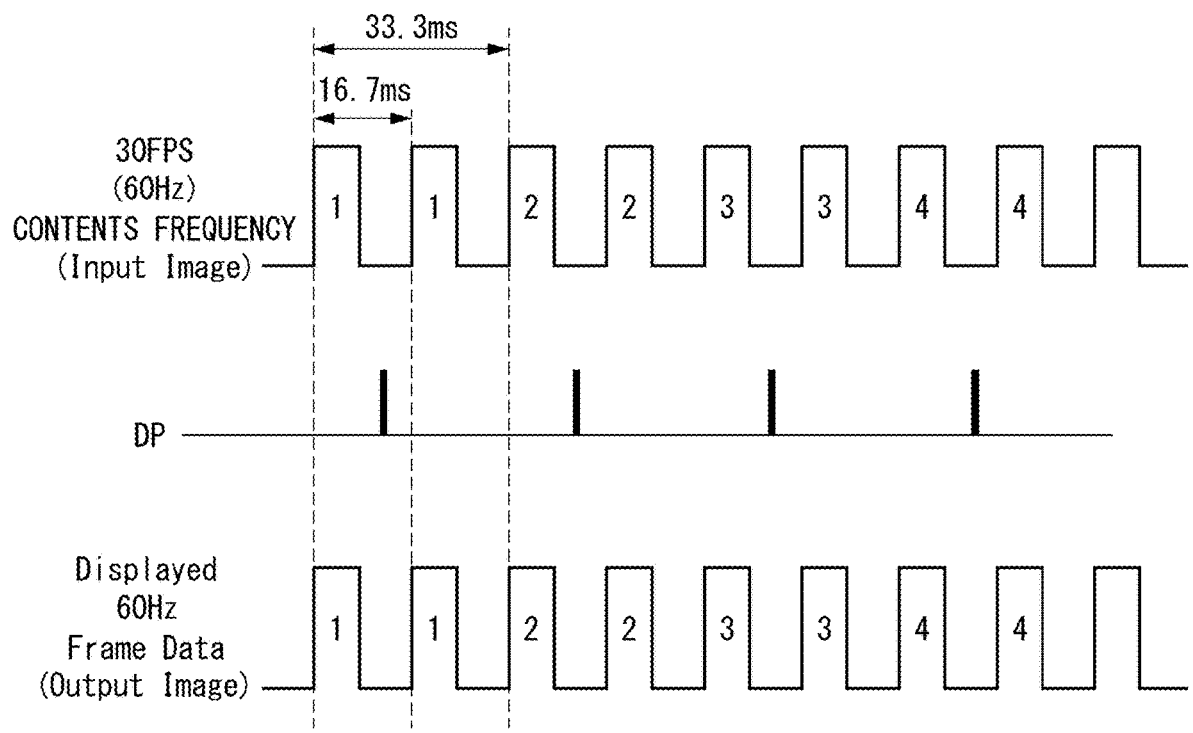
FIGS. 7A and 7B are diagrams illustrating generation timing of a pixel displacement value and interpolated frame data.
Figure 7B:
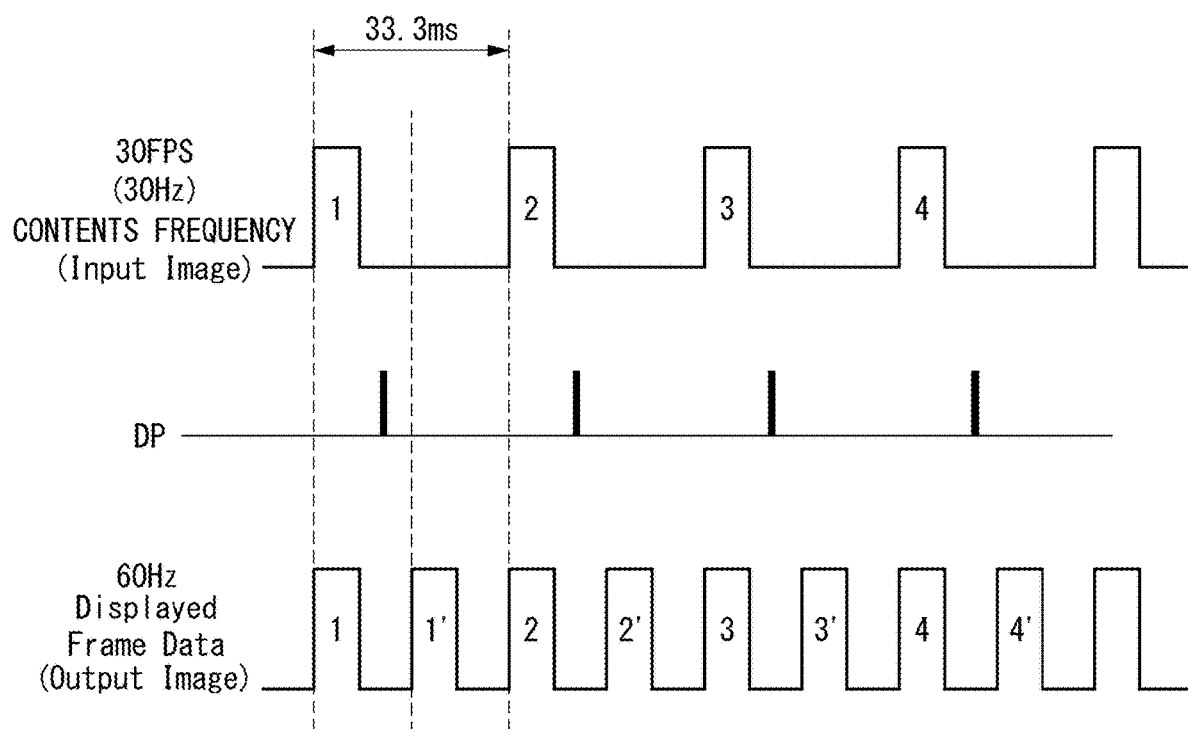

FIG. 5 is a diagram illustrating an image generation device according to an embodiment of the present disclosure. FIG. 6 is a view illustrating an input/output image of an image generation device shown in FIG. 5. FIGS. 7A and 7B are diagrams illustrating generation timing of a pixel displacement value DP and interpolated frame data.

Referring to FIGS. 5 to 7B, a timing controller 130 includes an image generation device as shown in FIGS. 5 and 6. In FIG. 6, "I/F" means the image generation device of the present disclosure. The image generation device I/F outputs frame data (n, n+1, n+2) received from the GPU as it is in an odd-numbered frame period, and outputs interpolated frame data (n', (n+1)', (n+2)') generated depending on the output SA of the motion sensor 302 in an even-numbered frame period.

The image generation device includes a memory 132, a motion calculator 134, an interpolation frame generator 136, a multiplexer 138, and a frame counter (not shown). The frame counter generates a frame count value FC for distinguishing an odd-numbered frame from an even-numbered frame by counting a timing signal generated once in one frame period, for example, at least one of a vertical synchronization signal (Vsync) and a start signal of the gate driver 120, and supplies the frame count value FC to a selection terminal of the multiplexer 138.

The memory 132 stores the frame data of the input image received from the GPU of the system controller 300. When the nth frame data is received by the image generation device, the nth frame data (n) is output as it is through the multiplexer 138. The motion calculator 134 and the interpolation frame generator 136 move pixel data of the nth frame data (n) to generate the nth interpolated frame data (n') based on the sensor-based prediction model. The nth interpolated frame data (n') generated from the interpolation frame generator 136 is output through the multiplexer 138. The multiplexer 138 outputs the nth interpolated frame data (n') after outputting the nth frame data (n) in response to the frame counter value FC.

The motion calculator 134 converts the angle value received from the motion sensor 302 into the pixel displacement value DP. The interpolation frame generator 136 generates the nth interpolated frame data (n') by shifting the frame data by the pixel displacement value. In FIG. 6, n, n+1, and n+2 are frame data generated by the GPU. n', (n+1)', and (n+2)' are interpolated frame data generated by the image generation device.

The GPU can transmit image data of 30 FPS to the timing controller 130 at a frame frequency of 30 Hz or 60 Hz. The image data of 30 FPS includes 30 frame data per second.

As shown in FIG. 7A, the GPU can transmit the image data of 30 FPS to the timing controller 130 at a frame frequency of 60 Hz by generating the same one frame data twice consecutively during one frame period (33.3 ms) of 30 FPS. In FIGS. 7A, 1, 2, 3, and 4 denote frame data numbers. In FIG. 7A, the GPU outputs a first frame data 1 twice during a first frame period, and then outputs a second frame data 2 twice during a second frame period. The timing controller 130 may calculate a pixel displacement value based on the angular value received in real time from the motion sensor 302, and shift the first received frame data in the same frame data by this pixel displacement value to generate interpolated frame data (1', 2', 3', 4'). The interpolated frame data (1', 2', 3', 4') is transmitted to the data driver 110 instead of the second frame data in the same frame data.

As shown in FIG. 7B, the GPU can transmit the image data of 30 FPS to the timing controller 130 at a frame frequency of 30 Hz by generating the same one frame data once consecutively during one frame period (33.3 ms) of 30 FPS. In FIGS. 7B, 1, 2, 3, and 4 denote frame data numbers. The timing controller 130 calculates a pixel displacement value based on the angular value received in real time from the motion sensor 302, and shifts the frame data received from the GPU by this pixel displacement value to generate interpolated frame data (1', 2', 3', 4'). The interpolated frame data (1', 2', 3', 4') is added between the nth and (n+1)th frame data generated by the GPU and transmitted to the data driver 110.

FIGS. 8 to 12 are views showing an image generation method according to the present disclosure.

Figure 8:
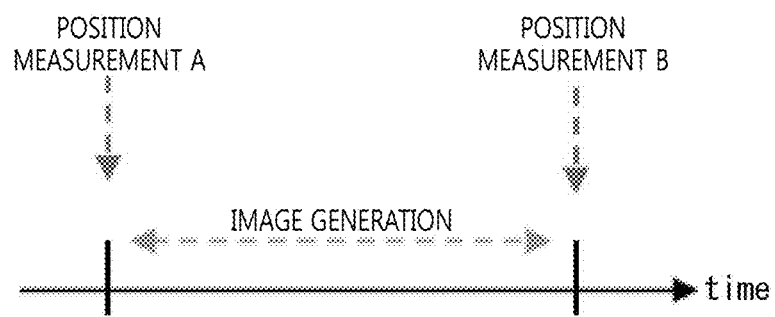
FIG. 8 is a diagram illustrating an example in which a position of a pixel viewed by a user changes on the time axis when a user turns his/her head.
Figure 9:
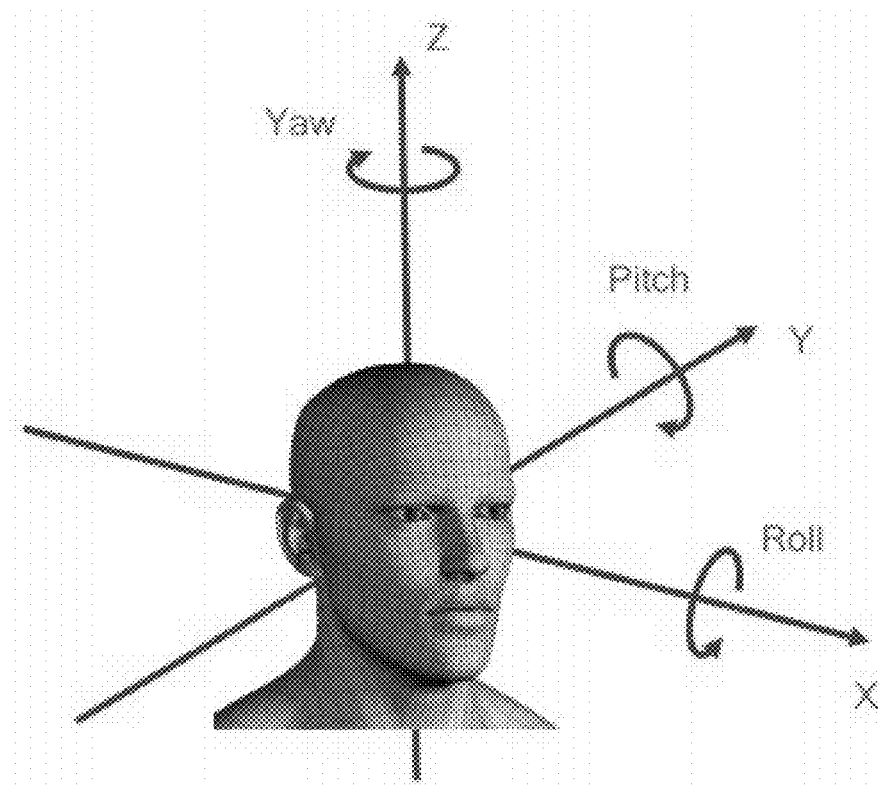
FIG. 9 is a view illustrating pitch, yaw, and roll when a user's head is rotated in three axial directions (X, Y, Z)
Figure 11:
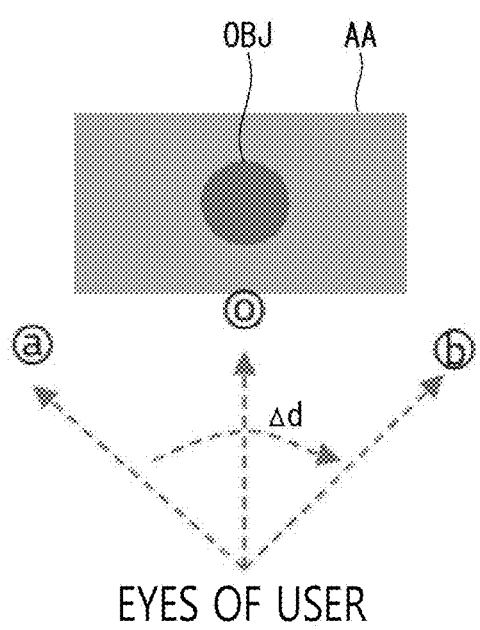
FIG. 11 is a view illustrating an angle value of a motion sensor when a user turns his/her head.

Referring to FIGS. 8 and 11, when the user wearing the VR/AR system turns his/her head, the motion sensor 302 outputs a motion of the user as angle values of pitch, yaw, and roll to detect the motion of the user. That is, the angle value may indicate motion about each of the X, Y, and Z axes. For example, a user may move his/her head in such a way that it rotates about two or more of the X, Y, and Z axes in a single motion, and the angle value may represent angle values of such motion about the two or more X, Y, and Z axes. The yaw is a rotation around the Z axis, and the pitch is a rotation around the Y axis. The roll is a rotation around the X axis. The angle value of the roll changes (e.g., increases or decreases) when the user rotates or tilts the head along the X axis, the angle value of the yaw changes (e.g., increases or decreases) when the user rotates in the left and right direction (e.g., by rotating the head along the Z axis), and the angle value of the pitch changes (e.g., increases or decreases) when the user rotates in the up and down direction (e.g., by rotating the head along the Y axis).

When the user turns his or her head, a position of a pixel viewed by the user changes from position A to position B on the screen as shown in FIG. 8. Since the motion sensor 302 rotates along a direction of rotation of the user's head as the user turns his/her head, the position of the pixel viewed by the user may be measured as an angle value (FIG. 11, Δd) output from the motion sensor 302. The image generation method of the present disclosure, as follows, calculates pixel displacement values DPYAW and DPPITCH using an output signal of the motion sensor 302, that is, the angle value Δd and horizontal and vertical resolutions of the display screen stored in the memory. DPYAW is the pixel displacement value in the yaw direction, and DPPITCH is the pixel displacement value in the pitch direction.

$$DP_{YAW} = \Delta d \times \frac{H}{FOV_H}$$

$$DP_{PITCH} = \Delta d \times \frac{V}{FOV_V}$$

Figure 10:
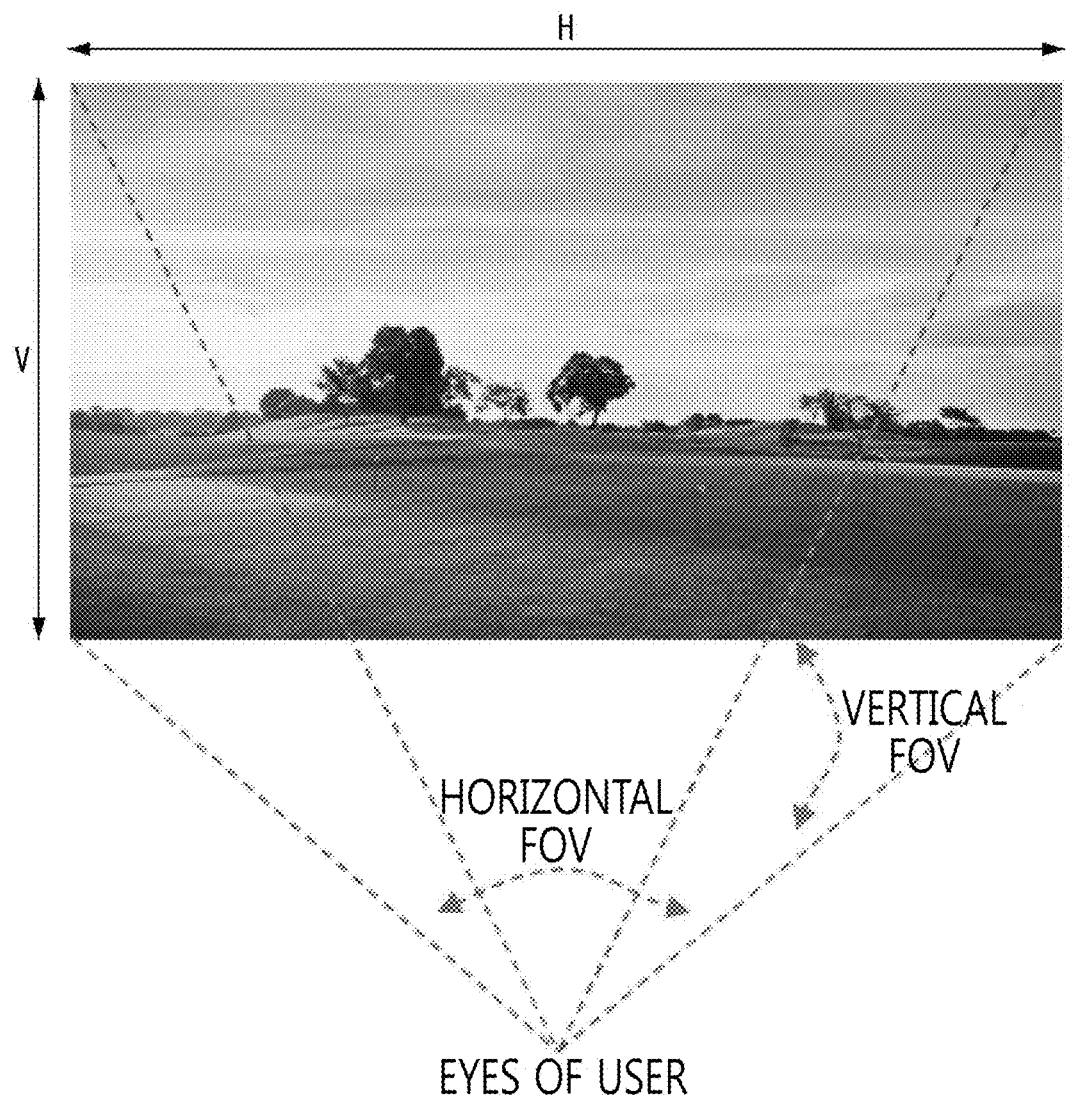
FIG. 10 is a view illustrating horizontal and vertical viewing angles of a user viewing a screen of a display panel.

Here, H and V are the horizontal resolution (H) and the vertical resolution (V) of the display screen as shown in FIG. 10. Field of view (FOV) is a viewing angle of the user viewing the display screen. FOVH is a horizontal viewing angle, and FOVV is a vertical viewing angle.

Therefore, the pixel displacement value DP includes a first pixel displacement value $DP_{PITCH}$ calculated by multiplying the angle value by a ratio of an up and down resolution (e.g., the vertical resolution (V)) of the screen to an up and down viewing angle (e.g., the vertical viewing angle (FOVV)) of the user, and a second pixel displacement value $DP_{YAW}$ calculated by multiplying the angle value by a ratio of a left and right resolution of the screen (e.g., the horizontal resolution (H)) to a left and right viewing angle (e.g., the horizontal viewing angle (FOVH)) of the user.

Figure 12:
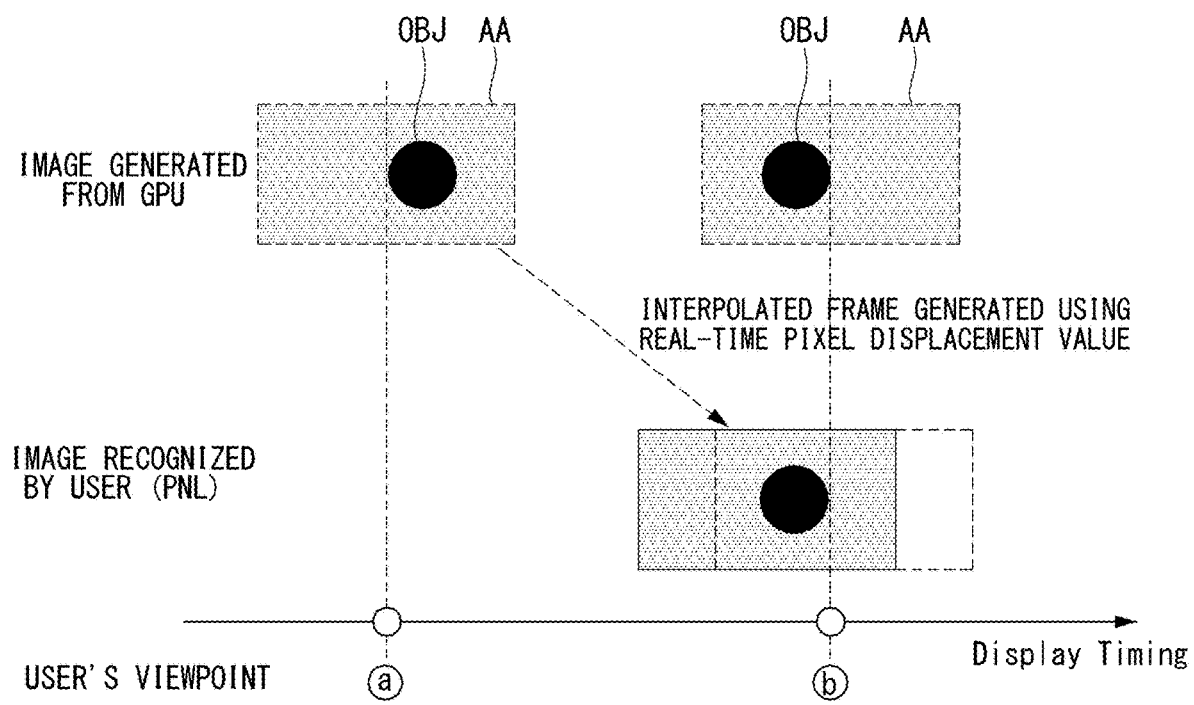
FIG. 12 is a diagram illustrating an interpolated frame image generated based on a real-time pixel displacement value generated depending on an angle value of a motion sensor.

Referring to FIGS. 11 and 12, when the user's viewpoint changes from position (a) to position (b), the position of the pixel viewed by the user changes. When the user moves, the display screen (AA) must be moved in a direction opposite to the motion of the user without delay so that the user can experience a realistic virtual world. In FIGS. 11 and 12, "OBJ" represents an object displayed on the display screen AA. The object OBJ is moved in a direction opposite to the direction in which the user moves.

Figure 13A:
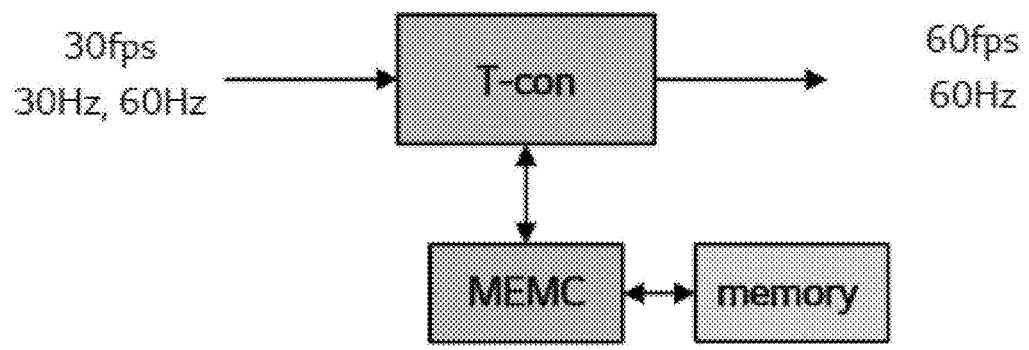
FIGS. 13A and 13B are views illustrating an example in which an MEMC module is connected to a timing controller.
Figure 13B:
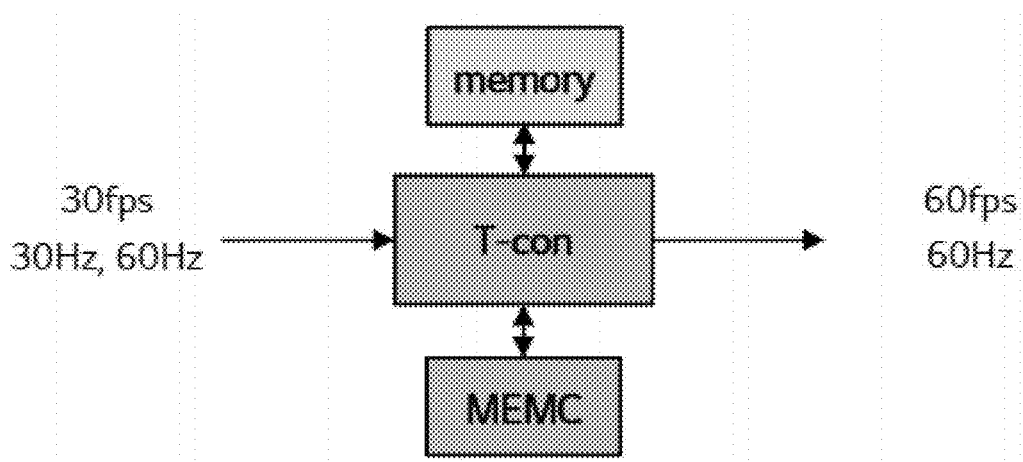

FIGS. 13A and 13B are views illustrating an example in which an MEMC module is connected to a timing controller.

As shown in FIGS. 13A and 13B, a chip integrated with a MEMC module may be connected to a timing controller T-con, or the MEMC module may be embedded in the timing controller T-con. Since the MEMC module, as described above, compares frame data received from the GPU to calculate a motion vector, the frame data is necessarily delayed by one frame period.

Figure 13C:
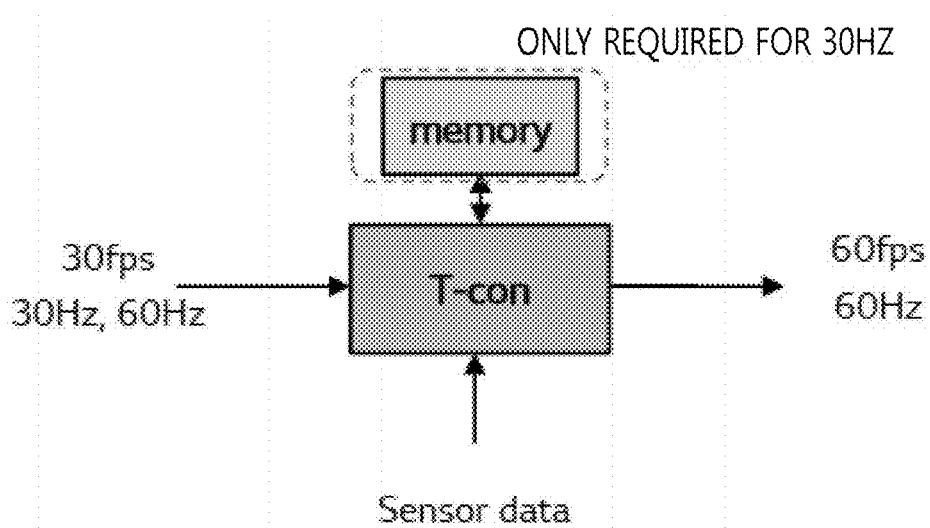
FIG. 13C is a diagram illustrating a timing controller receiving an output of a motion sensor without a MEMC module.

In contrast, since the timing controller T-con of the present disclosure determines the motion of the user in real time based on the output (sensor data) of the motion sensor 302, the motion of the user can be reflected on the display screen without delay. Therefore, it is not necessary to connect a separate MEMC module to the timing controller T-con as shown in FIG. 13C.

When the GPU transmits image data to the timing controller T-con at a frame frequency of 30 Hz, a memory for storing frame data is required. The memory shown in FIG. 13C may be the memory 132 of FIG. 5.

As described above, the present disclosure determines the motion of the user based on the angle value obtained from the motion sensor and the physical resolution of the display panel, and reflects the motion of the user on the screen in real time. As a result, according to the VR and AR system to which the present disclosure is applied, the user can enjoy an image without feeling dizziness when turning his/her head, and can enjoy an image without motion blur and motion judder.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An image generation method of a display device including a display panel configured to display an input image on a screen having a horizontal resolution and a vertical resolution, the method comprising:
   receiving, from a motion sensor, information representative of an angle value of motion sensed by the motion sensor;
   calculating a pixel displacement value based on the angle value;
   generating interpolated frame data by shifting frame data of the input image displayed on the screen based on the pixel displacement value; and
   displaying the frame data of the input image and the interpolated frame data on the screen,
   wherein the calculating the pixel displacement value includes:
      calculating a first pixel displacement value by multiplying the angle value by a ratio of an up and down resolution of the screen to an up and down viewing angle of a user; and
      calculating a second pixel displacement value by multiplying the angle value by a ratio of a left and right resolution of the screen to a left and right viewing angle of the user.

2. A display device comprising:
   a display panel configured to display an input image on a screen having a horizontal resolution and a vertical resolution;
   a motion calculator configured to calculate a pixel displacement value based on an angle value obtained from a motion sensor;
   an interpolation frame generator configured to generate interpolated frame data by shifting frame data of the input image displayed on the screen by the pixel displacement value; and
   a display driver configured to display the frame data of the input image and the interpolated frame data on the screen,
   wherein the pixel displacement value includes:
      a first pixel displacement value calculated by multiplying the angle value by a ratio of an up and down resolution of the screen to an up and down viewing angle of a user; and
      a second pixel displacement value calculated by multiplying the angle value by a ratio of a left and right resolution of the screen to a left and right viewing angle of the user.

3. The display device of claim 2, wherein the display panel is arranged in a virtual reality (VR) system or an augmented reality (AR) system.

4. A display device comprising:
- a display panel configured to display an input image on a screen having a horizontal resolution and a vertical resolution; and
- a display driver configured to write pixel data of nth (n is a positive integer) and (n+1)th frame data to the display panel,
- wherein the display driver, in use, receives an angle value representative of a motion of a user, converts the angle value into a pixel displacement value, and generates the (n+1)th frame data by shifting the nth frame data by the pixel displacement value, and
- wherein the pixel displacement value includes:
  - a first pixel displacement value calculated by multiplying the angle value by a ratio of an up and down resolution of the screen to an up and down viewing angle of a user; and
  - a second pixel displacement value calculated by multiplying the angle value by a ratio of a left and right resolution of the screen to a left and right viewing angle of the user.

5. The display device of claim 4, further comprising: a graphics processing unit configured to generate frame data of the input image at a predetermined frame rate and transmit the frame data to the display driver.

6. The display device of claim 5, wherein the graphics processing unit, in use, analyzes an image obtained from a camera to estimate a focus area of the user's gaze, and generates the frame data by increasing a resolution of the focus area and lowering a resolution of the input image in a surrounding area outside the focus area.

7. The display device of claim 4, wherein the display panel is arranged in a virtual reality (VR) system or an augmented reality (AR) system.

* * * * *